United States Patent
Morrison et al.

(10) Patent No.: US 7,200,845 B2
(45) Date of Patent: Apr. 3, 2007

(54) SYSTEM AND METHOD FOR HIGH AVAILABILITY FIRMWARE LOAD

(75) Inventors: John A. Morrison, Fort Collins, CO (US); Michael S. Allison, Fort Collins, CO (US); Stephen J. Silva, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 09/998,629

(22) Filed: Dec. 3, 2001

(65) Prior Publication Data

US 2003/0106051 A1    Jun. 5, 2003

(51) Int. Cl.
G06F 9/44       (2006.01)
G06F 13/10      (2006.01)
G06F 11/00      (2006.01)
G06F 15/177     (2006.01)

(52) U.S. Cl. .............. 717/172; 709/221; 710/104; 714/10

(58) Field of Classification Search ........ 717/168–173; 712/10–15; 709/221; 714/3–13
See application file for complete search history.

(56) References Cited

U.S. PATENT DOCUMENTS

| | | | |
|---|---|---|---|
| 5,163,052 A * | 11/1992 | Evans et al. .................. 714/31 |
| 5,704,031 A * | 12/1997 | Mikami et al. ................ 714/4 |
| 6,055,632 A * | 4/2000 | Deegan et al. .............. 709/221 |
| 6,334,177 B1 * | 12/2001 | Baumgartner et al. ...... 709/221 |
| 6,665,813 B1 * | 12/2003 | Forsman et al. .............. 714/15 |
| 6,684,343 B1 * | 1/2004 | Bouchier et al. ............. 714/4 |
| 6,725,317 B1 * | 4/2004 | Bouchier et al. ........... 710/312 |
| 6,834,340 B2 * | 12/2004 | Lee et al. .................... 713/100 |
| 2002/0091807 A1 * | 7/2002 | Goodman ................... 709/221 |

* cited by examiner

*Primary Examiner*—Tuan Dam
*Assistant Examiner*—Michael Yigdall

(57) ABSTRACT

A system and method updating firmware of cells in cellular, high availability, computing systems. One or more cells having missing, obsolete, corrupt, or otherwise errored firmware when compared to other cells in the partition are identified as mismatched cells. An update cell having desired firmware transmits an update message to each mismatched cell via a manageability system slow speed interconnect. In response to the update message, each mismatched cell enables a high speed interconnect over which they can receive the desired firmware. The update cell transmits the update firmware to each mismatched cell via the high speed interconnect.

10 Claims, 6 Drawing Sheets

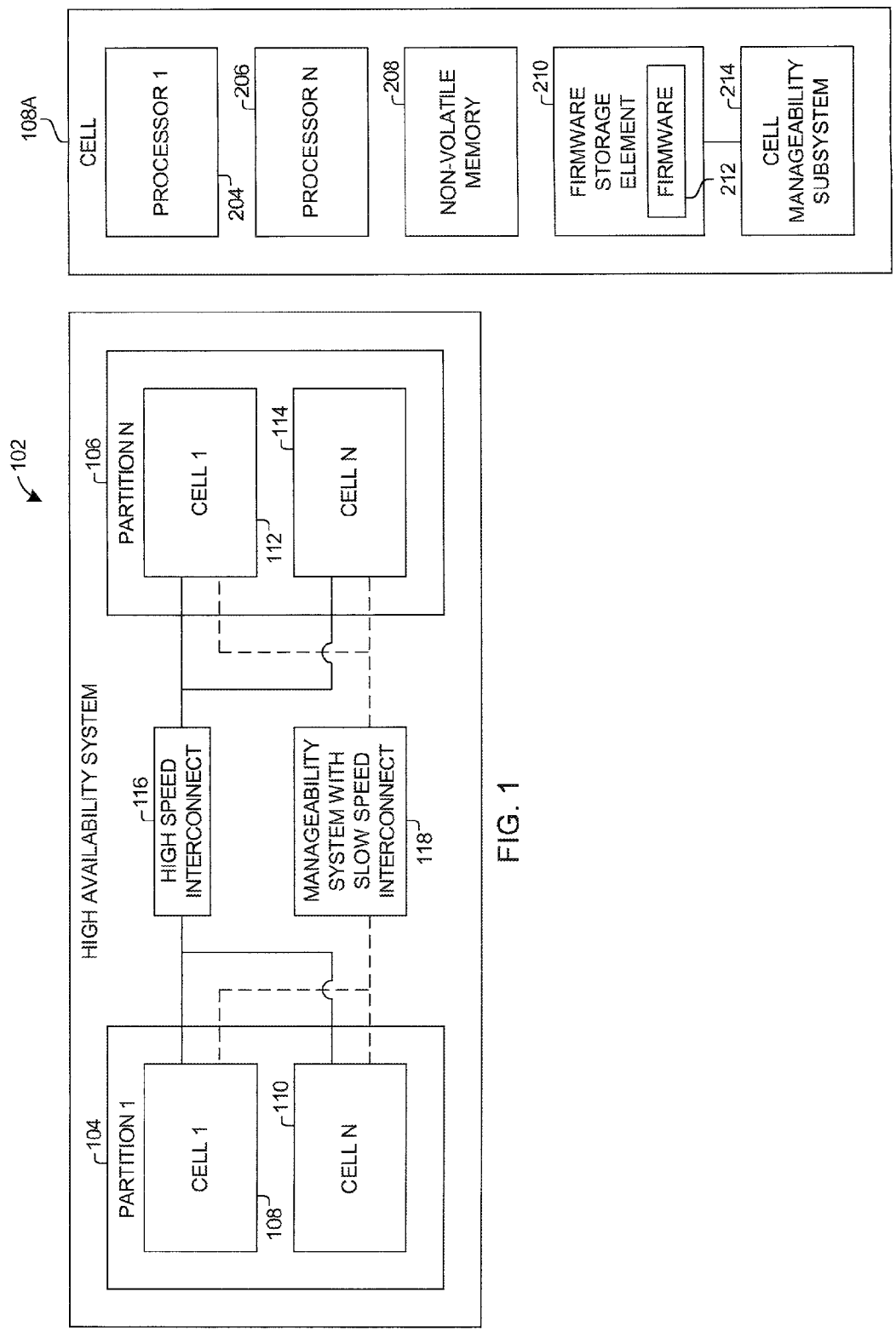

SYSTEM AND METHOD FOR HIGH AVAILABILITY FIRMWARE LOAD

FIELD OF THE INVENTION

The present invention relates to the field of loading firmware to a cell for a high availability processing system.

BACKGROUND OF THE INVENTION

Nonuniform memory access (NUMA) systems typically have one or more cells that are logically grouped into partitions. Each cell may have one or more processors.

Each processor may have its own local memory. The local memory for each processor is able to form static or dynamic connections with the local memory of other processors. Thus, the processors and memories are able to independently perform processing while also being able to communicate with each other. This enables a NUMA system to have a large number of processors that are able to communicate with each other while having a low threshold of congestion on buses connecting the shared memory.

The cells and processors in each partition are connected via a high speed interconnect. The high speed interconnect may be used to transfer data between cells. However, the high speed interconnect must be enabled for a cell before the cell can transfer and receive data over the high speed interconnect.

The NUMA system also may include a manageability system. The manageability system has a slow speed interconnect over which messages and other data can be communicated between the cells and shared memory even when the high speed interconnect is not enabled.

The manageability system typically includes a processor configured to monitor system status, such as the health of the system, to direct data between the cells, and to configure portions of the NUMA system. For example, the manageability system typically controls partitioning of the cells.

A cell manageability subsystem enables each cell to transmit and receive messages to and from other cells via the manageability system. The cell manageability subsystem enables the cells in a partition to protect themselves against messages arriving from cells outside of the partition or from other unauthorized cells.

Each cell has firmware. Firmware is code that executes for a computing system. Some firmware operates at the time of power-up to the time a processor boots. Other firmware includes real-time code that operates various peripherals or otherwise continues processing for the computing system. Firmware may, for example, test the health of a computing system on which it resides and/or load an operating system to a computing system on which it resides. This firmware may reside within one or more non-volatile memory parts, such as flash memory, battery-backed memory, read only memory (ROM), a programmable ROM (PROM), an erasable programmable ROM (EPROM), and/or an electrically erasable programmable ROM (EEPROM).

In some cases, firmware must be loaded to one or more cells to replace errored firmware. Errored firmware includes firmware that is not a desired version, non-existent firmware, firmware that is corrupt, firmware for which one or more cells have mismatched versions, and/or firmware in other errored conditions. A desired version of firmware may be a latest version of firmware.

Typically, firmware enables the high speed interconnect for the cells in a partition so the cells can transmit and receive data over the high speed interconnect. However, typically this occurs late in the firmware processing, such as in normal system firmware processing. Thus, if a cell has errored firmware, the normal system firmware does not operate, and the high speed interconnect is not enabled for the cells. As a result, those cells that have errored firmware will not be able to connect to the high speed interconnect and will not become part of the running partition.

Since the high speed interconnect is not enabled for cells having errored firmware, firmware needed to update these cells to an error free version or other desired version currently is loaded to the cells using the manageability system via the slow speed interconnect. In other instances, an off line diagnostics application is used to update or otherwise load firmware to the cells of the system. However, both processes are cumbersome and take a significant period of time to complete. In some instances, the system may be off line for thirty minutes or more during the firmware loading process. These cumbersome processes result in a waste of time and resources.

Thus, new systems and methods are needed to enable loading firmware to the system in a more timely and resource efficient manner. The systems and methods of the present invention enable loading firmware to a high availability system quickly with a savings in time and system resources.

SUMMARY OF THE INVENTION

In one aspect, the present invention is directed to a system for loading firmware in a high availability system. The system comprises a high speed interconnect and at least a first cell and a second cell. The first cell is coupled to the high speed interconnect, comprises errored firmware, and is configured to enable the high speed interconnect. The second cell is coupled to the high speed interconnect, comprises update firmware, and is configured to load the update firmware to the first cell via the high speed interconnect to replace the errored firmware.

In another aspect, the present invention is directed to a method for loading firmware in a high availability system comprising a high speed interconnect and at least a first cell and a second cell. The first cell is coupled to the high speed interconnect and comprises errored firmware such that the high speed interconnect is not enabled for the first cell. The second cell is coupled to the high speed interconnect and comprises update firmware. The method comprises enabling the high speed interconnect by the first cell and loading the update firmware from the second cell to the first cell via the high speed interconnect to replace the errored firmware.

In still another aspect, the present invention is directed to a system for loading firmware in a high availability system. The system comprises a high speed interconnect, a manageability system, and at least a mismatched cell and an update cell. The mismatched cell is coupled to the high speed interconnect, comprises errored firmware, and is configured to receive an update message via the manageability system interconnect, and in response thereto, to enable the high speed interconnect. The update cell is coupled to the high speed interconnect, comprises update firmware, and is configured to transmit the update message to the mismatched cell and to automatically load the update firmware to the first cell via the high speed interconnect.

BRIEF DESCRIPTION OF THE DRAWINGS

FIG. 1 is a block diagram illustrating a high availability system in accordance with an embodiment of the present invention.

FIG. 2 is a block diagram of a cell of a high availability system in accordance with an embodiment of the present invention.

DETAILED DESCRIPTION OF THE PREFERRED EMBODIMENTS

Figure 3:
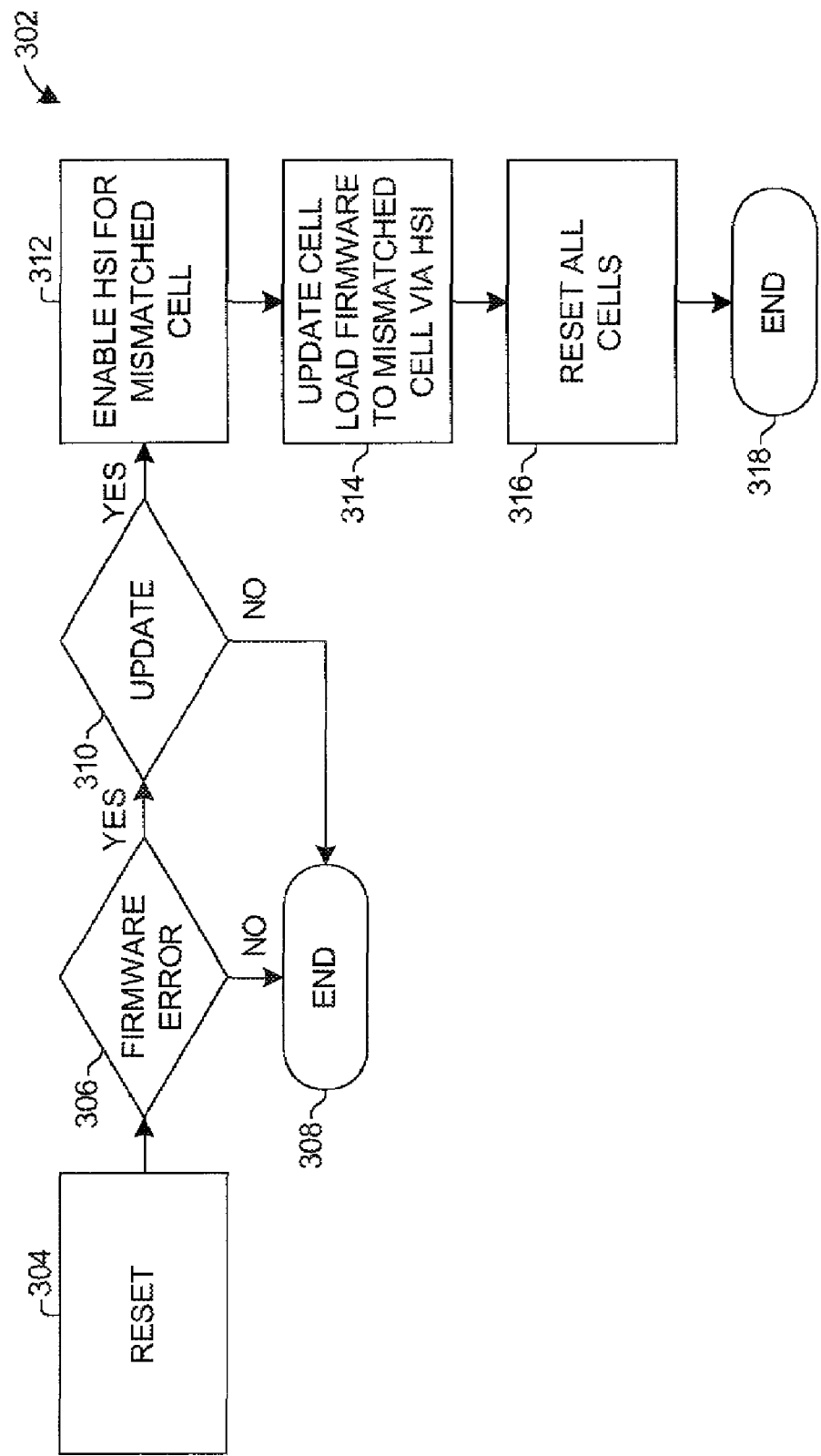
FIG. 3 is a flow diagram illustrating an error correction process in accordance with an embodiment of the present invention.

The present invention enables a high speed interconnect so that updating firmware may be loaded to memory of one or more cells of a computing system when the original firmware has an error. Whereas, prior systems used a slow speed interconnect of a manageability system to load updating firmware to a cell when the cell's original firmware has an error. Use of the high speed interconnect decreases the time required to load firmware to the cells, resulting in the system being off-line for a shorter period of time during the updating firmware load than the period required by the prior systems. Additionally, the cells may be programmed, i.e. the firmware loaded, in parallel in some embodiments to increase the speed in which more than one cell is programmed. Moreover, since one cell can update another cell using the present invention, neither a boot server nor an input/output system is required to load updating firmware to a cell. These increased efficiencies result in a system having high availability (HA) attributes.

In one embodiment of the present invention, a boot block is used to boot a cell of a computing system in which firmware is to be loaded. Since the boot block requires only the functionality needed to put the cell in a state in which it can receive or transmit firmware from or to another cell, the boot block requires only a small amount of processing capability and memory. The resulting savings in firmware size enables the boot block to operate and process firmware loading in a short period of time. Moreover, a cell having the boot block can be plugged into different partitions, and the cells in those partitions then can be updated with the correct firmware from the cell with the boot block. Thus, a cell with a boot block can be used in remote and secure facilities to load firmware to other cells, and the cells need not have been pre-loaded with the correct firmware or any firmware at a prior time. Also, using the boot block may save a user from having to pull cells out of the computing system to reprogram them.

FIG. 1 depicts an exemplary embodiment of a high availability system of the present invention. The high availability system 102 of FIG. 1 comprises a first partition 104 and a second partition 106. The first partition 104 includes a first cell 108 and an Nth cell 110, and the second partition 106 includes a first cell 112 and an Nth cell 114. Each of the cells 108–114 are connected by a high speed interconnect 116. The high availability system 102 also includes a manageability system 118 that interconnects the cells 108–114 with a slow speed interconnect.

The partitions 104 and 106 each are a logical grouping of one or more cells running an operating system. Each cell within a partition 114 or 106 is configured with information identifying the other cells in the partition and identifying the other cells with which it can communicate. If a partition 104 or 106 has more than one cell, one of the cells is designated as a core cell to govern the processing of the rest of the cells. In the example of FIG. 1, the Nth partition 106 represents any number of partitions that may be included in the high availability system 102. Thus, it will be appreciated that a single partition, such as the first partition 104, or more than one partition, as represented by the Nth partition 106, may be included within the high availability system 102.

The cells 108–114 are configured to process firmware to perform one or more functions. In the example of FIG. 1, the Nth cells 110 and 114 represent any number of cells that may be included in the partitions 104 and 106. Thus, it will be appreciated that a single cell, such as the first cell 108 and 112, or more than one cell, as represented by the Nth cell 110 and 114, may be included within the partitions 104 and 106.

Each cell 108–114 is configured with information identifying the other cell or cells, if any, within its partition. Each cell 108–114 may have a cell manageability subsystem configured to enable the cell to communicate with other cells in its partition 104 and 106 via the slow speed interconnect of the manageability system 118. For example, the first cell 108 is configured to communicate with the Nth cell 110 within the first partition 104 using the slow speed interconnect of the manageability system 118. Similarly, the first cell 112 is configured to communicate with the Nth cell 114 in the Nth partition 106 using the slow speed interconnect of the manageability system 108.

A cell 108–114 may enable the high speed interconnect 116 so that the enabling cell may accept data, such as a firmware load, over the high speed interconnect. When a cell 108–114 enables the high speed interconnect, that cell opens itself to the high speed interconnect. If a cell 108–114 or firmware, such as an operating system, does not enable the high speed interconnect 116, it is closed to the high speed interconnect and cannot receive data via the high speed interconnect. The cells 108–114 cannot receive data via the high speed interconnect 116 when the high speed interconnect has not been enabled for them.

Each cell 108–114 also may have one or more processors, nonvolatile memory, and firmware storage elements, such as flash memory. If a cell 108–114 has more than one processor, one of the processors is designated as a core processor to control the processing of the other processors within the cell. If a cell 108–114 has only one processor, it is designated as the core processor. Thus, a core cell and a core processor are designated for each partition 104 and 106.

The core cell has the same components as the other cells. In addition, the core cell also has an input/output (I/O) interface. The I/O interface may be used to receive firmware updates and/or data via the manageability system 118.

The I/O interface also may be used to activate a user interface. The user interface is configured to generate information for viewing by a user and to receive information, such as a user input.

In one embodiment, the I/O interface displays a boot control handler (BCH) menu. The BCH is a user menu activated by the firmware to provide information to a user and to receive commands from a user. The BCH generates information for memory, the operating system, peripheral devices, and other data. The BCH may generate status data and other information. The BCH may be configured to request a command, such as whether the cell or partition should be reset from a network, a disk, a compact disk read only memory (CD ROM), or another location. The BCH may provide configuration access to a user so that the user may enter configuration information and direct configuration commands to one or more cells. Other machine specific information may be generated to a user or received from a user via the BCH. Commands received via the BCH, and/or results of processes or configurations occurring from those commands, may be stored in nonvolatile memory. For example, a command sequence resulting in a cell configuration can be preserved and reused.

In one example, the BCH is activated to advise a user that a partition is misconfigured because one or more cells in the partition have a different version of firmware than the cell having a desired version of firmware. The cells that do not have the desired version of version or that have firmware in some other errored condition are referred to herein as mismatched cells. The BCH can be activated to enable a user to continue with the configuration without the mismatched cells, to update the firmware of the mismatched cells to a desired version, to reset all of the cells, or to proceed to some other operation.

A cell having errored firmware, such as a mismatched cell, has not been enabled for the high speed interconnect. Thus, a cell with errored firmware cannot communicate via the high speed interconnect unless that cell enables the high speed interconnect, such as with the present invention. If a cell has errored firmware, and that cell does not enable the high speed interconnect, that cell communicates via the slow speed interconnect of the manageability system 118.

Errored firmware includes firmware that is not a desired version, non-existent firmware, firmware that is corrupt, firmware for which one or more cells have mismatched versions, and/or firmware in other errored conditions. A desired version of firmware may be a latest version of firmware. In some embodiments, a cell not having any firmware may be identified as having firmware with a version of 0.0. A corrupt version of firmware may be identified, for example, by using an authentication mechanism, such as by determining a checksum or a cyclic redundancy check (CRC). If the checksum or CRC is not correct, the firmware is assumed to be corrupt. In other examples, another authentication mechanism may be used, such as a secure hash or other authentication mechanism.

The desired version of firmware may be configurable in some embodiments. For example, the BCH may be used to specify that the latest error-free version of firmware is the desired version of firmware. In other examples, a latest version of firmware may be determined to have a bug, and a different version may be designated as the desired version.

In one embodiment, the core cell of each partition 104 or 106 determines if the partition has a mismatched cell. In other embodiments, a cell with the desired firmware version determines if the partition has one or more mismatched cells.

Any cell 108–110 or 112–114 within a partition 104 or 106 may be a mismatched cell, including the core cell. Thus, in some instances, the core cell may be identified as a mismatched cell.

Preferably, if one or more mismatched cells are identified, they will be loaded with the desired version of firmware. Preferably, the mismatched cells will be loaded in parallel with the desired version of firmware. Loading the mismatched cells in parallel with the desired version of firmware greatly enhances the speed at which the cells can be programmed, as opposed to loading them one-by-one. The desired version may be the latest error-free version. Thus, if a mismatched cell contains errored firmware, including firmware that is not the desired version of firmware, corrupt firmware, no firmware, or other errored firmware, that mismatched cell will receive a firmware load. This firmware load is referred to as update firmware.

While any cell within the partition can be a mismatched cell, similarly any cell within the partition can provide the update firmware. A cell providing update firmware may be referred to as an update cell.

While more than one cell may have the desired version of firmware, only one of the cells having the desired version of firmware will provide the update firmware to the mismatched cell or mismatched cells. In one embodiment, each cell 108–114 is provided a designation from 1 to N. For simplicity, the cell having the lowest designation and having the desired version of firmware will load the update firmware to each mismatched cell. For example, if three cells exist where the second cell and the third cell both have the desired version of firmware and the first cell is a mismatched cell, then the second cell will provide the update firmware to the first cell. Other selection criteria for designating the cells and designating an update cell exist.

The cells 108–110 or 112–114 within a partition 104 or 106 communicate with each other when the cells are reset. Handshaking occurs between the cells 108–110 or 112–114 of a partition 104 or 106 so that information can be exchanged between the cells. This handshaking is referred to as a rendezvous.

At certain points in the rendezvous, the cells 108–110 or 112–114 anticipate receiving particular information from each other. Alternately, at these points in the rendezvous, processing may be paused to receive an input command from a user, from other firmware, or from a boot block (see below). Moreover, the cells 108–110 or 112–114 may be moved to a point in the rendezvous in which processing is paused so that a firmware load may be completed. Communications for the rendezvous occur via the slow speed interconnect of the manageability system 118, typically because the high speed interconnect has not been enabled for the cells.

For example, one rendezvous is defined as a boot inhibit bit (BIB) rendezvous. At the BIB rendezvous, the cells 108–110 or 112–114 within a partition 104 or 106 communicate to provide status information to the other cells within the partition. For example, at the BIB rendezvous, the cells 108–110 or 112–114 for each partition 104 or 106 are identified, the core cell for each partition is identified, and each cell identifies its firmware version to the other cells. Other actions may occur.

In another example, another rendezvous is defined as a firmware (FW) rendezvous. At the FW rendezvous, the cells 108–110 or 112–114 of a partition 104 or 106 stop processing and wait for a command from another cell or from the manageability system 118. This command may include a message instructing the cell 108–114 to complete an action. This command also may include a firmware load.

In yet another example, another rendezvous is defined as a partition (PD) rendezvous. The PD rendezvous is a state at which all cells are placed when errored firmware is discovered with an automatic update process so that the firmware error may be determined.

Other rendezvous points exist. Although, for simplicity, only the above referenced rendezvous points are identified. One skilled in the art is aware of other handshaking and rendezvous points in the operation of firmware. Also, it will be appreciated that the above identified rendezvous points may be identified using other designations. For example, the BIB rendezvous may be identified as a first rendezvous, the FW rendezvous may be identified as a second rendezvous, and the PD rendezvous may be identified as a third rendezvous.

The high speed interconnect 116 connects the cells 108 and 110 in the first partition 104, and it connects the cells 112 and 114 in the Nth partition 106. In some instances, the high speed interconnect 116 may connect the cells 108–114 between the partitions 104 and 106. The high speed interconnect 116 may be, for example, a bus, a crossbar, a shared memory, or another type of interconnect. In one embodiment, the high speed interconnect 116 is a programmable crossbar.

The high speed interconnect 116 is configured to transfer messages and other data, such as a firmware load, to one or more of the cells 108–114. However, the high speed interconnect 116 should be enabled for a cell 108–114 before the cell can receive messages or other data from the high speed interconnect.

The manageability system 118 manages the high availability system 102. The manageability system 118 identifies how the high availability system 102 is partitioned, including which cells 108–114 are in which partitions 104 and 106.

The manageability system 118 may be configured to monitor the environment of the high availability system 102. For example, the manageability system 118 may monitor temperature, fan speed, the electrical systems, power output, and other environmental aspects of the high availability system 102.

In some instances, the manageability system 118 may be configured to make adjustments to the high availability system 102. For example, the manageability system 118 may be configured to turn off a clock or power to portions of the high availability system 102 or to the whole system. In other examples, the manageability system 118 may be configured to adjust the clock rate for a portion of the high availability system 102 or for the whole system to adapt the high availability system, such as for heat and/or load management. For example, the manageability system may be configured to adjust the clock rate of one or more processors.

The manageability system 118 may have a controller, such as a service processor, configured to direct messages and data between the cells 108–114. In addition, the manageability system 118 may be configured with an I/O interface. The manageability system 118 may be configured to receive firmware from an outside source via an I/O interface, and flash the firmware to one or more cells 108–114.

The manageability system 118 has a slow speed interconnect connecting the cells 108–114. The slow speed interconnect connects with a separate cell manageability subsystem for each cell. All messages and data, including any firmware flashes, that are transmitted between the cells 108–114 using the manageability system 118 are transmitted via the slow speed interconnect. The slow speed interconnect may be, for example, a serial bus.

FIG. 2 depicts an exemplary embodiment of a cell 108A of the present invention. The cell 108A of FIG. 2 comprises a first processor 204, an Nth processor 206, nonvolatile memory 208, firmware storage element 210, firmware 212, and a cell manageability subsystem 212.

The processors 204 and 206 process firmware 212 to carry out operations for the cell 108A. The processors 204 and 206 also may be configured to control transmitting messages and data to and from the cell 108A. In the example of FIG. 2, the Nth processor 206 represents any number of processors resident in the cell 108A. Thus, it will be appreciated that a single processor, such as the first processor 204, or more than one processor, as represented by the Nth processor 206, may reside within the cell 108A.

The nonvolatile memory 208 is configured to store data used by the processors 204 and 206 during operation and to provide quick access for that data to the processors. While a single nonvolatile memory 208 block is depicted in FIG. 2, it will be appreciated that the nonvolatile memory is associated with each processor 204 and 206 consistent with a nonuniform memory access (NUMA) system. Thus, the nonvolatile memory 208 may be shared by the processors 204 and 206 or the nonvolatile memory may be separate nonvolatile memories each associated with a single processor 204 or 206 and each forming a static or dynamic connection with the other nonvolatile memories. In one embodiment, the nonvolatile memory 208 is nonvolatile random access memory (NVRAM).

The firmware storage element 210 stores firmware 212 and other data. The firmware storage element 210 is able to receive and store firmware loads, such as an update to the firmware 212 or a new load for the firmware. Thus, the firmware storage element 210 is an updateable memory. In one embodiment, the firmware storage element 210 includes a non-volatile memory part, such as flash memory, battery-backed memory, and/or a read only memory (ROM). The ROM may include a programmable ROM (PROM), an erasable programmable ROM (EPROM), and/or an electrically erasable programmable ROM (EEPROM).

The firmware 212 is code that executes for the high availability system 102. The firmware 212 may be stored in the firmware storage element 210 as an image.

The firmware 212 may include executable code, data for use by a compiled program, an output of a compiled program, a section of data or code that can be transferred to a programmable device, a section of code or data for use by a system having a configuration, or other code or data useful for operation of the high availability system 102. The firmware also may include real time code that operates various peripherals or otherwise continues processing for the high availability system 102. In some instances, firmware may, for example, test the health of the high availability system and/or monitor the environment of the high availability system.

In one embodiment, the firmware 212 may include processor dependent code (PDC) that operates to reset the high availability system 102 to a point at which normal system firmware operates. The PDC checks the status of each peripheral and processor associated with the cell in which the PDC resides. Thus, the PDC checks the status of, for example, the processors 204 and 206, the nonvolatile memory 206, the firmware storage element 210, and the cell manageability subsystem 214. In addition, the PDC may be configured to check the status of any associated hardware peripherals, including power supplies and/or fans. The PDC validates the system components to determine whether or not the system components are operating for the high availability system 102. Also, the PDC may be configured to provide run time services, such as run time queries for features. For example, the PDC may receive a query to determine what system components are associated with the particular cell. Thus, the PDC may be large in size and take an extended period of time to process. For example, in one instance, the PDC may be 4 megabytes (MB) and may take up to 10 minutes to process.

In another embodiment, the firmware 212 may include a boot block. The boot block performs only a portion of the operations performed by a PDC. The boot block operates to place one or more cells within a state in which the high speed interconnect is enabled for those cells and in which they are able to receive a firmware load. This state is the FW rendezvous state. Thus, the boot block is not required to test the health of the high availability system 102, or any cells therein. Additionally, the boot block may not have memory and I/O status check capability. Because the boot block has a limited operational requirement, its size is greatly reduced. Thus, in some instances, the boot block may process within seconds.

The firmware 212 may include the PDC and/or the boot block. In some embodiments, only the boot block or only the PDC may be included in the firmware 212. Moreover, in other embodiments, firmware other than the PDC or the boot block may be included in the firmware 212.

The cell manageability subsystem 214 transmits messages from, and receives messages at, the cell 108A. The cell manageability subsystem 214 communicates via the slow speed interconnect of the manageability system 118. In some instances, the cell manageability subsystem 214 may be configured to flash firmware to the firmware storage element 210.

In some embodiments, the cell manageability subsystem 214 may include a processor configured to monitor environmental factors of the cell 108A. For example, the cell manageability subsystem 214 may include a processor configured to monitor power or temperature. In addition, the cell manageability subsystem 214 may be configured to adjust parameters of the cell 108A, such as to turn off power to the cell or to adjust the clock speed of a processor on the cell.

FIGS. 3–6 depict exemplary embodiments of firmware loading processes of the high availability system 102 of FIGS. 1–2. For simplicity, the embodiments of FIGS. 3–6 and their associated discussions depict operations for one partition. However, the embodiments of FIGS. 3–6 may be used equally to load firmware to all cells in all partitions of the high availability system 102.

FIG. 3 depicts an exemplary embodiment of a firmware loading process. The loading firmware 302 operating the process of FIG. 3 resides in the firmware storage element 210.

The cells are reset at step 304. It is determined at step 306 if errored firmware exists on any of the cells of the partition. If no cell has errored firmware at step 306, the process ends at step 308. Although, it should be noted that other firmware may be processed after step 308, such as normal system firmware processing.

If one or more cells have errored firmware at step 306, but if the errored firmware is not to be updated at step 310, the process ends at step 308. If the errored firmware is to be updated at step 310, the process continues at step 312. At step 310, a manual update or an automatic update may be designated to update the errored firmware.

At step 312, an update cell is designated, and each mismatched cell enables the high speed interconnect so that each mismatched cell may receive the update firmware. The update cell loads the update firmware to each mismatched cell via the high speed interconnect at step 314. In this example, the update cell may be the core cell or any other cell that has the desired firmware version.

After the update cell loads the update firmware to each mismatched cell at step 314, the update cell resets all the cells in the partition at step 316. The process then ends at step 318.

Figure 4:
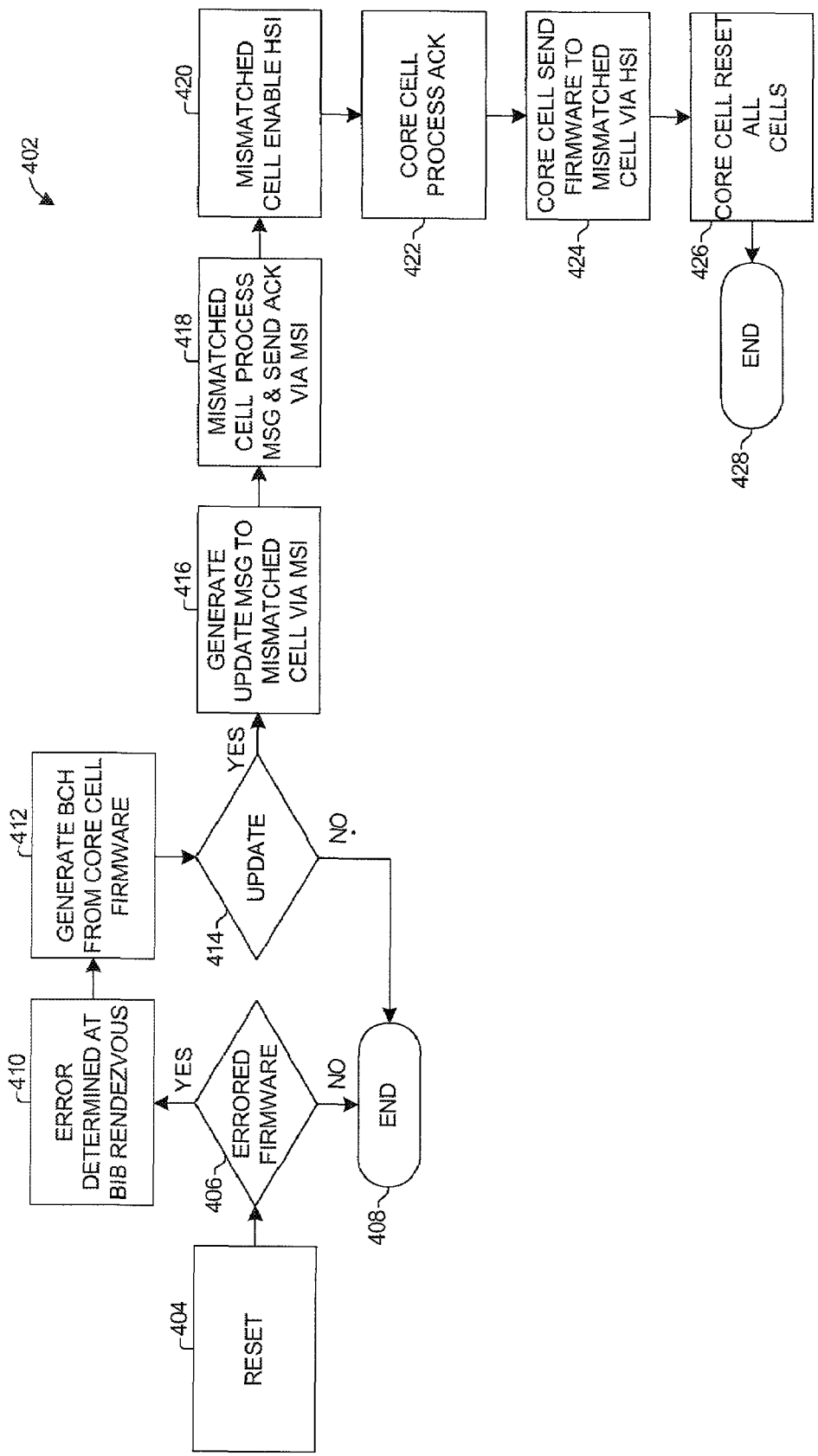
FIG. 4 is a flow diagram illustrating a manageability enhanced manual update process in accordance with an embodiment of the present invention.

FIG. 4 depicts an exemplary embodiment of a manageability enhanced manual update process. The manual update firmware 402 operating the processes of FIG. 4 resides in the firmware storage element 210.

The cells for a partition are reset at step 404. If no cells have errored firmware at step 406, the process ends at step 408. Although, it should be noted that other processes may occur after step 408, such as normal system firmware processing.

If one or more cells have errored firmware at step 406, all cells in the partition proceed to the BIB rendezvous where the error is determined at step 410. In this example, the core cell examines the other cells in the partition to determine if one or more cells have errored firmware. The core cell uses the manageability system slow speed interconnect (MSI) to communicate with the other cells in the partition. The cells having errored firmware are referred to as mismatched cells.

After the error is determined at step 410, the core cell activates the BCH at step 412. If an update command is not received at step 414 in response to generating the BCH, the process ends at step 408. If an update command is received at step 414 in response to generating the BCH, the core cell generates an update message to each mismatched cell via the MSI at step 416. Each mismatched cell receives and processes the update message and sends an acknowledgment to the core cell via the MSI at step 418. Each mismatched cell then enables the high speed interconnect (HSI) for that cell so that it may receive the update firmware at step 420. The core cell processes the acknowledgement(s) at step 422 and sends the update firmware to each mismatched cell via the HSI at step 426. The core cell resets all cells in the partition at step 426, and the process ends at step 428.

It will be appreciated that in other embodiments, the mismatched cells need not send an acknowledgement and the core cell need not receive and process an acknowledgement prior to sending the update firmware to each mismatched cell. In such an embodiment, the core cell may be configured to generate the update firmware to each mismatched cell after generating the update message. However, the core cell may be configured to wait for a period of time between generating the update message and generating the update firmware.

Figure 5:
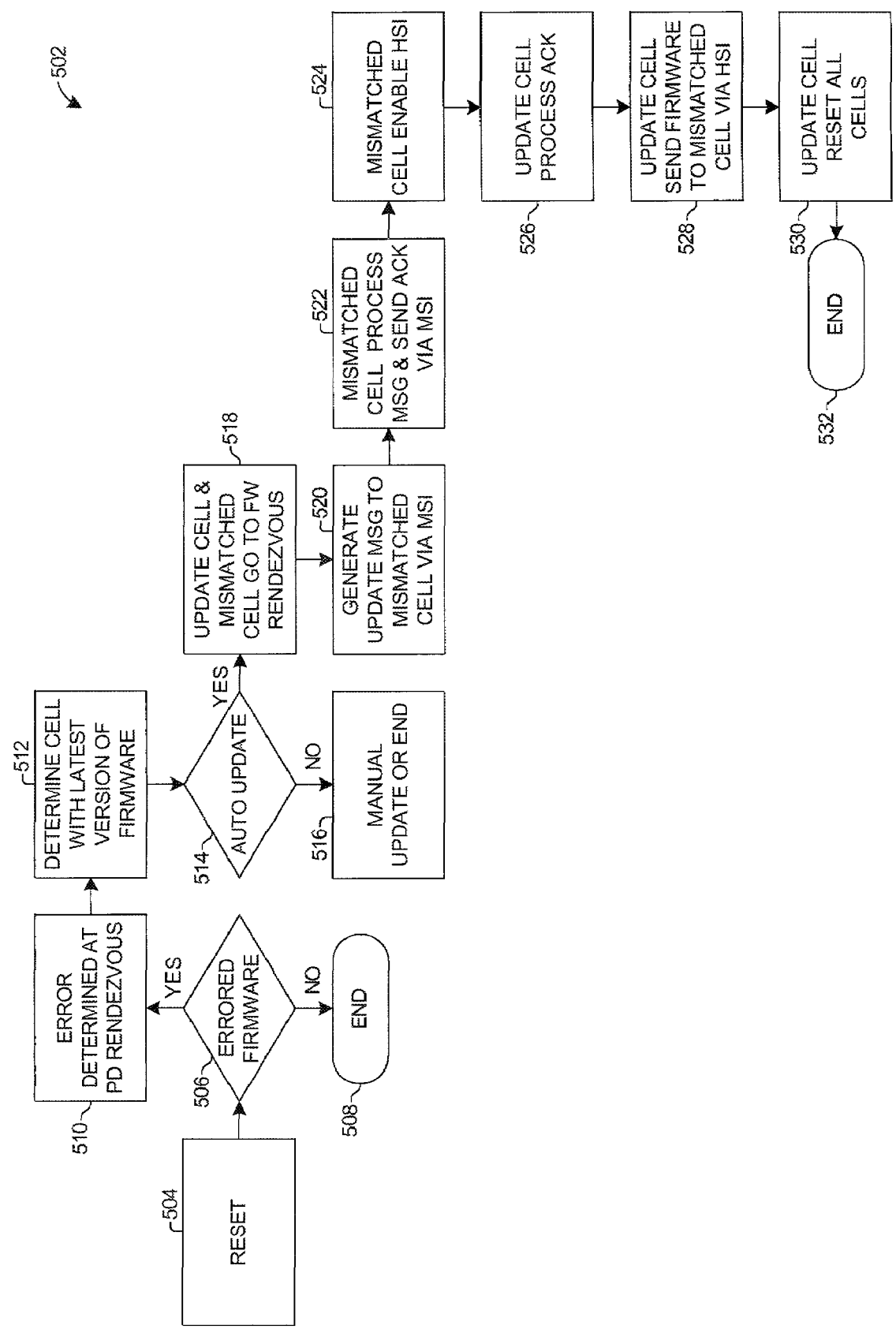
FIG. 5 is a flow diagram illustrating an automatic update process in accordance with an embodiment of the present invention.

FIG. 5 depicts an exemplary embodiment of an automatic update process. The automatic update firmware 502 operating the processes of FIG. 5 resides in the firmware storage element 210.

The automatic update process of FIG. 5 enables self-healing for the high availability system 102 without user intervention. This self-healing automatic update may increase efficiencies over manual update processes.

At step 504, the cells in the partition are reset. If no cells in the partition have errored firmware at step 506, the process ends at step 508. Although, it should be noted that other processes may continue after step 508, such as operating system processes.

If any cells have errored firmware at step 506, the cells are sent to the PD rendezvous where the error for the firmware is determined at step 510. The PD rendezvous is a state at which all cells are placed when errored firmware is discovered with the automatic update process.

All cells wait at the PD rendezvous until the cell with the desired version of firmware is determined at step 512. If multiple cells have the desired version, a default cell can be selected using a selection criteria, such as the selection criteria described above. The cell providing the update firmware is referred to as the update cell. The cells having errored firmware are referred to as mismatched cells.

After the update cell is determined at step 512, if the mismatched cells are not to be automatically updated at step 514, the process is sent to a manual update at step 516. A manual update step is optional. Alternately, the process can be ended at step 516 or another process can be selected.

If the mismatched cells are to be automatically updated at step 514, the update cell and each mismatched cell are placed in the FW rendezvous state at step 518. The update cell generates an update message to each mismatched cell via the MSI at step 520. Each mismatched cell processes the update message and transmits an acknowledgement to the update cell via the MSI at step 522. Each mismatched cell enables the HSI for that cell so it may receive the update firmware via the HSI from the update cell at step 524. The update cell processes the acknowledgement at step 526 and transmits the update firmware to each mismatched cell via the HSI at step 528. The update cell resets all cells in the partition at step 530, and the process ends at step 532.

In the embodiment of FIG. 5, the mismatched cells may be automatically updated with update firmware from an update cell. Several methods may be used to accomplish the automatic update. In one embodiment, an auto update flag is created and held in the nonvolatile memory 208. The auto update flag may be set or not set. The automatic update firmware 502 may read the auto update flag to determine if it is set or not set. If the auto update flag is set, the auto update firmware may proceed to automatically update the mismatched cells. If the auto update flag is not set, the auto update firmware may proceed to another step, such as ending the process, providing a manual update option, or proceeding to another process. The auto update flag may be set, for example, using the manageability system 118 or using a menu activated by the firmware, such as a BCH menu.

In other embodiments, the auto update firmware itself may be set or not set to provide the automatic update to the mismatched cells. Alternately, the automatic update firmware may be configured to review status data or preconfigured data to determine whether or not to automatically update the mismatched cells. Other methods exist.

Also, it will be appreciated that in other embodiments, the mismatched cells need not send an acknowledgement and the update cell need not receive and process an acknowledgement prior to sending the update firmware to each mismatched cell. In such an embodiment, the update cell may be configured to generate the update firmware to each mismatched cell after generating the update message. However, the update cell may be configured to wait for a period of time between generating the update message and generating the update firmware.

Figure 6:
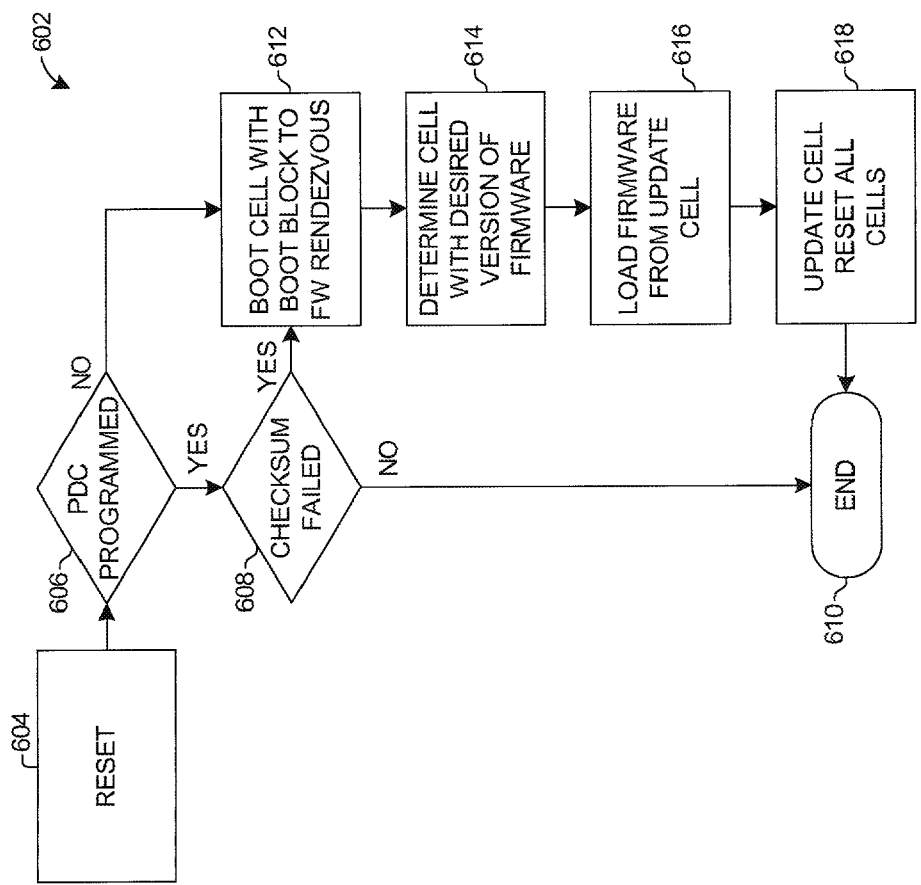
FIG. 6 is a flow diagram illustrating a boot block self healing process in accordance with an embodiment of the present invention.

FIG. 6 depicts an exemplary embodiment of a boot block self healing process. The boot block self healing firmware 602 operating the processes of FIG. 6 resides in the firmware storage element 210.

The boot block self healing process of FIG. 6 uses a boot block to determine if the PDC for a cell is able to operate, and, if not, the boot block places the cell at the FW rendezvous, at which point the PDC can be programmed or the firmware update can be loaded. In this example, the boot block can be configured to power up the machine on which the cell resides, test the region of the firmware storage element where the PDC is located to determine if the PDC exists and is not corrupt, and if it exists and is not corrupt, to enable another process to operate the system. A subpart of the boot block referred to as correction firmware determines if the PDC exists and if the PDC is not corrupt. In one embodiment, the correction firmware determines if the PDC is corrupt by determining if the PDC checksum is correct. In other embodiments, the correction firmware determines if the PDC is corrupt by determining if a PDC CRC is correct In some embodiments, the firmware storage element is not programmed with a PDC. In these cases, when the firmware storage element is checked for a PDC, hexadecimal Fs are returned for access to the portion of the firmware storage element that is not programmed. Other methods can be used to determine if the PDC is not programmed.

The boot block self-healing process of FIG. 6 resets all cells at step 604. Each cell may have a boot block, a PDC, and/or other firmware configured to place the cell at the FW rendezvous.

In one example, one cell may have a boot block, and another cell may have a PDC. In another example, two cells each have a boot block. In both examples, the cells are able to reset at least to the FW rendezvous.

In addition, in these examples, at least one cell has the desired firmware. The cell that has the desired firmware need not be the same as the cell that has the boot block. In other examples, a boot block may boot a cell from an external device or a desired version of firmware may be loaded from an external device.

If the PDC is programmed at step 606, and if the PDC checksum does not fail at step 608, the process ends at step 610. Although, it should be noted that another process may continue at step 610, such as an operating system process.

If the PDC is not programmed at step 606, or if the PDC checksum fails at step 608, the cell is booted with the boot block to the FW rendezvous at step 612. The cell in the partition having the desired version of firmware is determined at step 614. This cell is designated as the update cell. Any other cell having errored firmware is designated as a mismatched cell.

The update cell loads the update firmware to each mismatched cell at step 616. Within step 616, the update cell may generate an update message to each mismatched cell, and each mismatched cell will enable the high speed interconnect in response to the update message. Optionally, the process of FIG. 4 and/or the process of FIG. 5 may be used to update the mismatched cells. The update cell resets all cells in the partition at step 618, and the process ends at step 610.

It will appreciated that a manageability interface of a manageability system is not required for the system of FIG. 6. Only a single master cell is needed, and that master cell can load firmware to all other cells in the partition. Since a user need not load firmware to a partition, this process requires minimal user interaction, resulting in a significant savings of time and resources.

Moreover, a master cell using the process of FIG. 6 can load firmware to all other cells in all instances. For example, firmware need not be loaded to cells at a manufacturing facility when the cells are created. The master cell can be plugged into the high availability system at any location, and that master cell will load the firmware to all other cells in the partition and in the high availability system 102. The master cell need only have the boot block and error-free firmware. This can be a great advantage to technicians attempting to update or otherwise load firmware to a high availability system, either when that high availability system is being installed or when it is being updated.

In some instances, it cannot be determined whether or not the firmware is errored. This may occur regardless of whether a boot block is or is not present. For example, the firmware and the boot block may be errored. Alternately, neither the firmware nor the boot block may be present. Other examples exist. Thus, an attempted execution of the firmware or code within the firmware storage element will not result in an execution of error free code.

In these instances, a boot block or a desired version of the firmware may be loaded to at least one cell. This cell may be designated as the update cell and update the other cells in the partition. For example, a boot block or the desired version of firmware may be loaded to the update cell via the manageability system. The update cell then may load the update firmware in parallel to the other cells in the partition. Preferably, at least the boot block will be loaded in parallel from the manageability system to all the cells in the partition, and the desired version of firmware will be loaded to the update cell via the manageability system. Then, the update cell may place all cells within the partition at the FW rendezvous, load the update firmware to the cells, and then reset all cells in the partition.

In some instances, it may be preferable to load the boot block to the nonvolatile memory of a cell, rather than to the firmware storage element of the cell. When the cell is reset, thus enabling the boot block to boot the cell, the reset vector can be routed to the non-volatile memory so that the cell may be booted. Thereafter, the cell can operate as the update cell or be placed at the FW rendezvous to receive the firmware load from the update cell. This process enables the whole firmware storage element to be programmed, since the processor operating the boot block is executing out of the non-volatile memory.

Preferably for this embodiment, the boot block will be loaded to the nonvolatile memory of each cell via the manageability system. Additionally, a desired version of the firmware will be loaded to a cell designated as the update cell. The update cell thereafter can place all cells in the partition at the FW rendezvous, load the desired version of the firmware to the memory storage element of each cell, and reset all of the cells.

Figure 7:
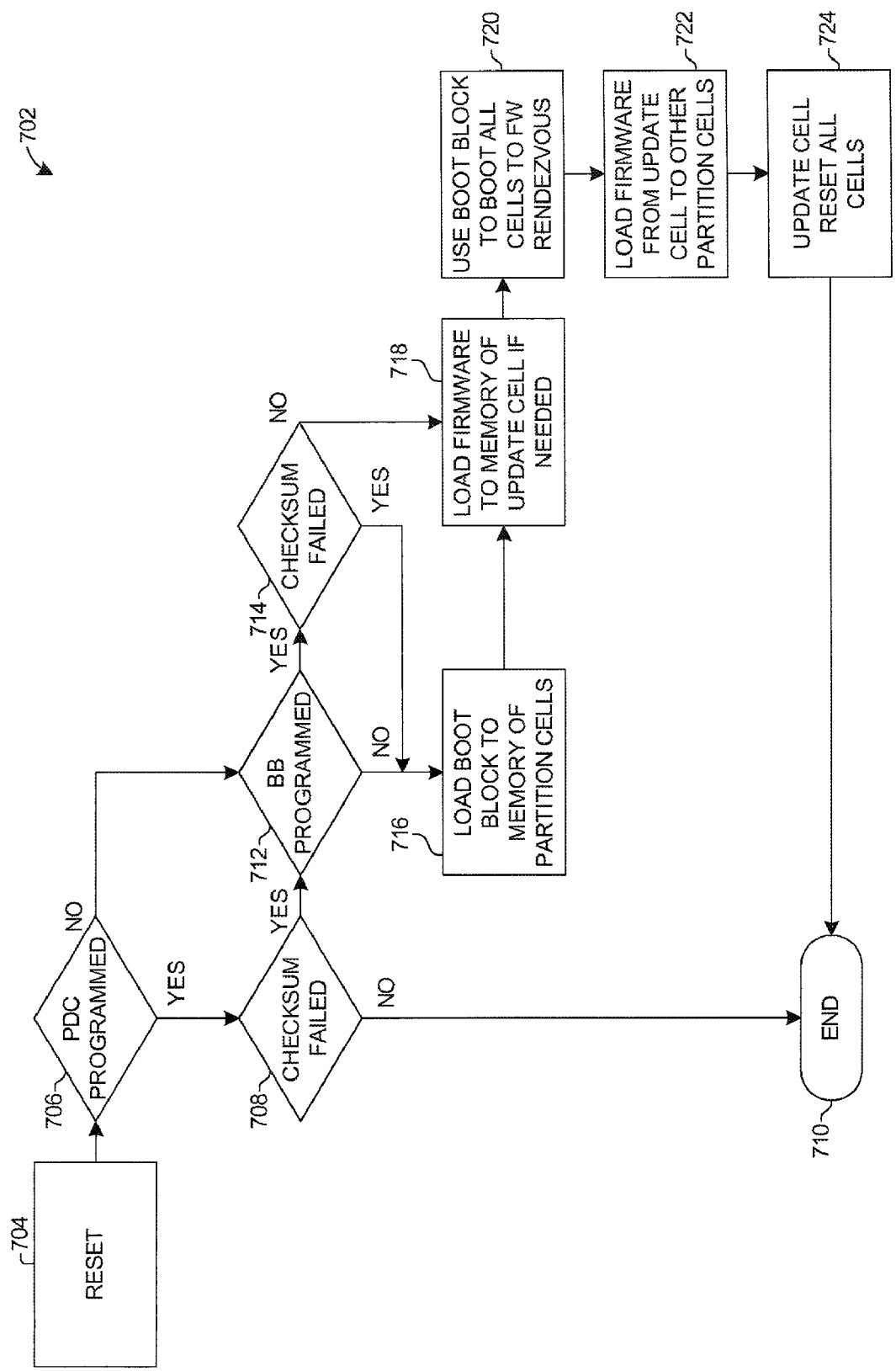
FIG. 7 is a flow diagram illustrating a process for loading a boot block to memory via the manageability system in accordance with an embodiment of the present invention.

FIG. 7 depicts an exemplary embodiment of the process for loading a boot block to memory via the manageability system. The boot block loading firmware 702 operating the processes of FIG. 7 reside in a firmware storage element in one embodiment and in a non-volatile memory in another embodiment.

The boot block loading process of FIG. 7 attempts to reset the cells at step 704. If a PDC is programmed for each cell at step 706, and if the PDC check sum does not fail for each at step 608, then firmware is loaded for all the cells, and the firmware is not errored. In that instance, the process ends at step 710. Although, it should be noted that another process may continue at step 710, such as an operating system process.

If the PDC is not programmed for all cells at step 706, or if the check sum fails for at least one cell at step 708, it is determined if a boot block (BB) is programmed at step 712 for those cells that do not have a PDC programmed or for which the check sum failed. If the a boot block is not programmed for all cells not having a desired version of the PDC at step 712, or if the check sum fails at step 714, the boot block is loaded to the memory of the cells in the partition that do not have the boot block or the desired version of the PDC at step 716.

Additionally, a desired version of firmware is loaded to the memory of at least one cell designated as the update cell at step 718. However, if a cell has a boot block, it may be used to load the desired version of firmware to one or more other cells in a partition, such as was described in the embodiment of FIG. 6. Alternately, if at least one cell has a PDC that is programmed and for which the check sum does not fail, that cell may be designated as an update cell to load the desired version of firmware to one or more other cells in a partition, such as in the embodiments of FIG. 3 or FIG. 4.

Preferably, the boot block and the desired version of firmware are loaded to the memory via the manageability system. In one embodiment, the boot block is loaded to the non-volatile memory of each cell. In other embodiments, the boot block may be loaded to the firmware storage element of each cell. In still other embodiments, the boot block may be loaded to the non-volatile memory of one cell and to the firmware storage element of another cell. In addition, while the desired version of firmware typically may be loaded to the firmware storage element, in some instances the desired version of firmware may be loaded to another memory location, such as the non-volatile memory.

The boot block in the update cell boots all cells to the FW rendezvous at step 720. The update cell then loads the desired version of firmware to the other cells in the partition at step 722. The update cell resets all cells in the partition at step 724, and the process ends at step 710.

Use of the high speed interconnect to load update firmware to cells in a partition provides a significant advance over prior systems in which the manageability system and its associated slow speed interconnect were used to update firmware. The high speed interface generally was unavailable in the prior systems to update cells with update firmware because normal system firmware was errored firmware, was not run, and had not enabled the cells for the high speed interconnect. Thus, the manageability system and its associated slow speed interconnect were used to update firmware in these prior systems. In the present system, cells enable the high speed interconnect. The resulting increased speed at which the firmware can be loaded via the high speed interconnect and the availability of resources due to the increased speed of the firmware load provide increased high availability attributes to the system when compared to the prior systems.

Those skilled in the art will appreciate that variations from the specific embodiments disclosed above are contemplated by the invention. The invention should not be restricted to the above embodiments, but should be measured by the following claims.

What is claimed is:

1. A high-availability cellular computer system capable of automatically updating firmware in cells of the system, the system comprising:
   a high speed interconnect;
   a management interconnect;
   a first cell and a second cell, each cell comprising at hardware level:
      at least one processor of the cell coupled to at least one random-access memory subsystem of the cell,
      at least one nonvolatile memory system coupled to the at least one processor of the cell,
      a high-speed interconnect interface coupling the at least one processor of the cell to the high speed interconnect;
      a management processor of the cell coupled to a nonvolatile memory for management code of the cell, and
      an interface coupling the management processor of the cell to the management interconnect;
   wherein the nonvolatile memory system of the first cell has recorded therein errored firmware, and the nonvolatile memory system of the second cell has recorded therein valid firmware;
   wherein the first cell contains machine readable code for recognizing that the firmware in the nonvolatile memory system of the first cell is errored firmware and, upon recognizing that the firmware for the first cell is errored, for transmitting over the management interconnect a request for valid firmware to the second cell, and for updating the nonvolatile memory system of the first cell with valid firmware;

wherein the second cell contains machine readable code for recognizing that the firmware in the nonvolatile memory system of the second cell is valid; and wherein the management code of the second cell comprises machine readable code to receive a request for valid firmware and, in response thereto, to transmit an acknowledgement via the management interconnect, to enable the high speed interconnect, and to transmit the firmware in the nonvolatile memory system of the second cell to the first cell via the high speed interconnect.

2. The cellular computer system of claim 1 wherein the errored firmware is corrupt firmware.

3. The cellular computer system of claim 1 wherein the errored firmware is outdated firmware.

4. A high-availability cellular computer system capable of automatically updating firmware in cells of the system, the system comprising:
   a physical high speed interconnect;
   a physical manageability interconnect;
      a first cell and a second cell, each cell comprising at least one physical processor coupled to
         at least one physical random-access memory subsystem of the cell,
         at least one physical nonvolatile memory system of the cell,
         a high-speed interconnect interface, and
         a cell manageability subsystem coupled to the manageability interconnect, the cell manageability subsystem comprising a cell manageability processor;
   wherein the high-speed interconnect interface of the first cell and the second cell is coupled to the high speed interconnect;
   wherein the nonvolatile memory system of the first cell has recorded therein errored firmware, and the nonvolatile memory system of the second cell has recorded therein valid firmware;
   wherein the first cell contains machine readable code for recognizing that the firmware in the nonvolatile memory system of the first cell is errored and, upon recognizing that the firmware of the first cell is errored, for updating the nonvolatile memory system of the first cell with firmware copied from a cell having valid firmware;
   wherein the second cell contains machine readable code for recognizing that the firmware in the nonvolatile memory system of the second cell is valid; and
   wherein the cell manageability processor of the second cell contains machine readable code to receive an update message via the manageability interconnect and, in response thereto, to transmit an acknowledgement via the manageability interconnect, to enable the high speed interconnect, and to transmit the firmware in the nonvolatile memory system of the second cell to the first cell via the high speed interconnect.

5. A high-availability cellular computer system capable of automatically updating firmware in cells of the system, the system comprising:
   a physical high speed interconnect;
   a physical manageability interconnect;
      a first cell and a second cell, each cell comprising at least one physical processor coupled to
         at least one physical random-access memory subsystem of the cell,
         at least one physical nonvolatile memory system of the cell,
         a high-speed interconnect interface, and
         a cell manageability subsystem coupled to the manageability interconnect, the cell manageability subsystem comprising a cell manageability processor;
   wherein the high-speed interconnect interface of the first cell and the second cell is coupled to the high speed interconnect;
   wherein the nonvolatile memory system of the first cell has recorded therein errored firmware, and the nonvolatile memory system of the second cell has recorded therein valid firmware;
   wherein the first cell contains machine readable code for recognizing that the firmware in the nonvolatile memory system of the first cell is errored and, upon recognizing that the firmware of the first cell is errored, for updating the nonvolatile memory system of the first cell with firmware copied from a cell having valid firmware;
   wherein the second cell contains machine readable code for recognizing that the firmware in the nonvolatile memory system of the second cell is valid; and
   wherein the cell manageability processor of the second cell contains machine readable code to receive an update message via the manageability interconnect and, in response thereto, for transmitting the firmware in the nonvolatile memory system of the second cell to the first cell via the manageability interconnect.

6. A high-availability cellular computer system capable of automatically updating firmware in cells of the system, the system comprising:
   a high speed interconnect;
   a manageability interconnect;
   a first cell and a second cell, each cell comprising at hardware level:
      at least one processor of the cell coupled to at least one random-access memory subsystem of the cell,
      at least one nonvolatile memory system coupled to the at least one processor of the cell,
      a high-speed interconnect interface coupling the at least one processor of the cell to the high speed interconnect, and
      a cell manageability processor coupled to the manageability interconnect;
   wherein the high-speed interconnect interface of the first cell and the second cell is coupled to the high speed interconnect;
   wherein the nonvolatile memory system of the first cell has recorded therein corrupt firmware, and the nonvolatile memory system of the second cell has recorded therein valid firmware;
   wherein the first cell contains machine readable code for recognizing that the firmware in the nonvolatile memory system of the first cell is corrupt and, upon recognizing that the firmware of the first cell is corrupt, for updating the nonvolatile memory system of the first cell with firmware copied from a cell having valid firmware;
   wherein the second cell contains machine readable code for recognizing that the firmware in the nonvolatile memory system of the second cell is valid; and
   wherein the cell manageability processor of the second cell has machine readable code to receive an update message via the manageability interconnect and, in response thereto, to transmit an acknowledgement via the manageability interconnect, to enable the high speed interconnect, and to transmit the firmware in the nonvolatile memory system of the second cell to the first cell via the high speed interconnect.

7. A method for updating firmware in a cellular, high availability, computing system comprising:
  providing a plurality of cells of a cellular computing system, where each cell has firmware and comprises:
    at least one processor,
    a random-access memory coupled to the at least one processor,
    a management processor, and
    a high-speed interconnect interface;
  determining a first cell of the plurality of cells having errored firmware, and an update cell of the plurality of cell having desired firmware;
  sending a firmware update request from the management processor of the update cell over a management interconnect to the management processor of the first cell; and
  transmitting the desired firmware from the update cell through a high-speed interconnect into the first cell;
  wherein the high-speed interconnect is distinct from the management interconnect, and during normal operation of the computing system is used for communications between a plurality of cells of the computing system.

8. The method of claim 7 wherein the errored firmware is firmware selected from the group consisting of missing firmware, corrupt firmware, and outdated firmware.

9. The method of claim 7 further comprising:
  wherein the update cell receives over the management interconnect an acknowledgement of the firmware update request from the first cell prior to transmitting the desired firmware to the first cell.

10. The method of claim 9 wherein the step of determining a first cell of the plurality of cells having errored firmware is performed by the management processors of the cells.

* * * * *